United States Patent

[11] 3,614,297

| [72] | Inventor | Elmer T. Carlson<br>Center Valley, Pa. |
|---|---|---|
| [21] | Appl. No. | 848,541 |
| [22] | Filed | Aug. 8, 1969 |
| [45] | Patented | Oct. 19, 1971 |
| [73] | Assignee | Broadhill Development Corporation<br>Hartford, Conn.<br>Continuation-in-part of application Ser. No. 769,485, Oct. 22, 1968, now Patent No. 3,504,097. |

[54] ELECTRICAL CONDUIT SYSTEM
7 Claims, 23 Drawing Figs.

[52] U.S. Cl. .................................... 174/88 B,
174/68 B, 174/70 B, 174/117 FF, 174/129 B
[51] Int. Cl. ........................................... H02g 15/08
[50] Field of Search........................................ 174/68 B,
71 B, 72 B, 88 B, 99 B, 129 B, 117.1, 117.11

[56] References Cited
UNITED STATES PATENTS

| 3,004,097 | 10/1961 | Johnston et al. | 174/88 B |
| 3,095,469 | 6/1963 | Cataldo | 174/88 B |
| 3,504,100 | 3/1970 | Yatabe et al. | 174/88 B |
| 2,200,776 | 5/1940 | Hoover | 174/117 (.11) X |
| 2,350,601 | 6/1944 | Frank et al. | 174/88 B X |
| 2,462,993 | 3/1949 | Peters et al. | 174/88 B X |
| 3,383,458 | 5/1968 | Raskhodoff et al. | 174/88 B X |

Primary Examiner—Darrell L. Clay
Attorney—Jackson, Jackson & Chovanes

ABSTRACT: A stack of insulated electrical conductors of rectangular external contour, each conductor preferably consisting of strip laminations, extends through a conduit which has an open position and a closed position in heat transfer relation with the insulation. In a connector a press clamps together overlapping end portions of corresponding conductors. Conduit envelopes are joined at the ends and conduits are suspended by hangers.

INVENTOR
ELMER T. CARLSON
BY
ATTORNEYS

PATENTED OCT 19 1971 3,614,297

INVENTOR
ELMER T. CARLSON

BY
*Jackson, Jackson and Chovanes*

ATTORNEYS

INVENTOR
ELMER T. CARLSON
BY
Jackson, Jackson and Thomas
ATTORNEYS

INVENTOR
ELMER T. CARLSON

BY
Jackson, Jackson and Nevius

ATTORNEYS

ELECTRICAL CONDUIT SYSTEM

The present invention is a continuation-in-part of my U.S. Pat. application Ser. No. 769,485, filed Oct. 22, 1968, for Electrical Conduit, U.S. Pat. No. 3,504,097, granted Mar. 31, 1970 which is incorporated herein by reference. This application has been divided and the subject matter divided is embodied in application Ser. No. 80,609, filed Oct. 14, 1970, for "Electrical Conduit System."

The present invention relates to an electrical conduit system through which conductors of indefinite length can be carried and arranged in stacks, the conduit envelope aiding in heat dissipation.

A purpose of the invention is to provide an electrical distribution system of low cost for industrial plants, commercial installations and public buildings.

A further purpose is to provide a conduit in which the allowable current carrying capacity is comparable with that of insulated wires exposed to the air.

A further purpose is to secure a low impedance configuration of conductors made of strip laminations so as to reduce the voltage drop and permit smaller conductor cross section.

A further purpose is to eliminate conductor joints which would be required in busways, and require less space for an installation.

A further purpose is to reduce the need for special fittings in a conduit.

A further purpose is to provide a connector for conductors each of which consists of a plurality of laminations surrounded by insulation with an end section in which certain laminations are relatively long and other laminations are relatively short and have diagonal ends, so that a cooperating conductor can be optionally arranged in prolongation, with the angular short laminations abutting and the long laminations overlapping short laminations of the other conductor, or, in the alternative, the conductor can be at an angle such as a right angle, with the longer laminations overlapping short laminations, and the short laminations abutting one another.

Further purposes appear in the specification and in the claims.

FIG. 4a is a view similar to FIG. 4 showing a variation, with provision made for a right-angle connection.

FIG. 7a is an exploded perspective of the connection of a pair of conductors at right angles to one another as in FIG. 4a.

FIG. 11 is a perspective showing a variant form of hanger.

FIG. 12 is a perspective showing a still further variant form of hanger.

FIG. 13 is a perspective showing an adapter for connecting the conduit of the invention with a switchboard or the like.

FIG. 21 is a diagrammatic cross section of a cable including several conductors which may be included in the conduit of the conductor. In industrial plants, commercial installations and public buildings, distribution of electrical current has been accomplished by electrical wires or cables exposed to the air, busways, wireways, and other raceways. Busways are relatively expensive, involving rigid conductors, and connections made at the end of each section, usually every 10 feet. Many of the other systems involve making elaborate field measurements and providing a variety of special fittings often required to make the joints and connections.

The present invention is primarily concerned with an electrical conduit which obtains heat dissipation by improved heat transfer to the envelope, the conductors themselves being flexible in a plane transverse to the clamping faces of the envelope and conforming to the shape of the envelope, and being of relatively indefinite length so that comparatively few electrical connections need be made. Thus in a typical preferred installation according to the invention, the envelope may be of a length of the order of 10 feet, whereas the conductors may be a length of the order of 50 feet or 100 feet.

When the conductors are first threaded through the envelope, the envelope cover remains retracted so as to allow ample space, but after the conductors have been properly installed the cover is tightened so that good heat transfer is obtained with the conductor insulation at both sides of the stack. The width of the conductors is such that they cannot be inserted in the open conduit edgewise and must go in flatwise.

In the preferred embodiment of the invention, each of the conductors consists of a plurality of strip laminations which are relatively wide and thin and are arranged with their broad sides in engagement in a given conductor. The group of laminations of a given conductor are surrounded by insulation which has a rectangular external cross section. In the preferred embodiment, the broad sides of the insulation of the conductors are in contact in the stack. In the preferred form of the invention, the conductors may be surrounded by cable insulation.

Merely by way of example, for a 600-volt distribution three or four conductors will extend through the conduit. Each conductor preferably consists of four to 12 laminations, each lamination having a cross section of the order of 50,000 circular mils. Thus each conductor is likely to range between 200,000 and 600,000 circular mils in size.

The laminations are suitably of electrical grade aluminum or electrical grade copper, or a mixture of aluminum and copper. A convenient size for the laminations is approximately 2 inches wide and approximately 0.020 inch thick, so that the laminations bend freely in the direction of their thickness. With laminations of this size, the external side of the conduit can be approximately 4 by 2¾ inches in the preferred embodiment.

The insulation on each conductor preferably has a thickness of about 60 mils and may be of any suitable electrically insulating material, for example rubber, synthetic rubber such as neoprene, Teflon TFE (polytetrafluoroethylene) or National Electric Code Standard Insulation TWHN.

The preferred insulation according to the invention is a moisture and heat-resistant cross-linked thermosetting polyethylene insulation of the type described in National Electric Code, Article 310, page 70–94, XHHW of about 60 mils thick, permitting a permissable temperature rise to about 90° C. of a character sold by General Electric Company as Vulcene, by kaiser Aluminum Corporation as Kathene and by General Cable Company as Genkene. Where the conductors are used as a cable, they will have an outer cable insulation, for example, of nylon.

The conductors used in the invention when of aluminum are preferably given a copper or bronze plate followed by 0.2 mils of tin plate, a preferred process being the Alstan process of Aluminum Company of America.

The sheet metal nonelectrically conducting parts of the invention are preferably of sheet aluminum, but they may be made of steel, stainless steel, magnesium, plastic or other suitable material.

Figure 1:
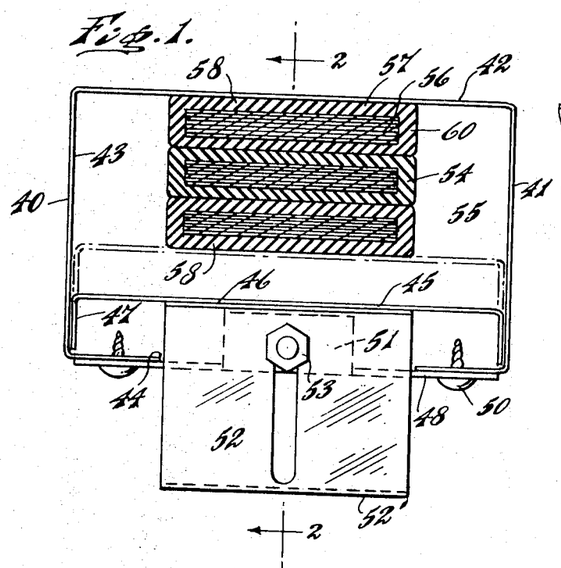
FIG. 1 is a transverse section of a conduit of the invention, the cover being shown in open or expanded position for insertion of conductors and also in contracted position engaging a stack of conductors for improved heat transfer.
Figure 2:
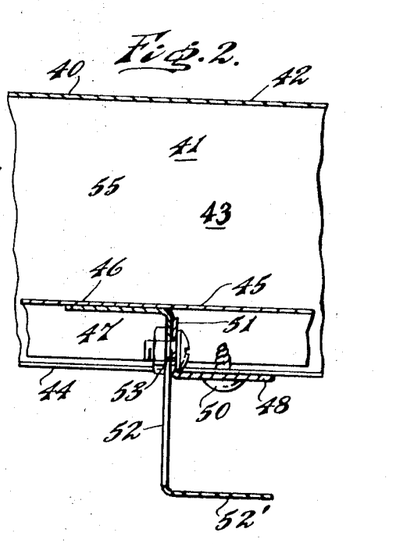
FIG. 2 is a fragmentary section of FIG. 1 on the line 2—2 omitting the conductors.
Figure 3:
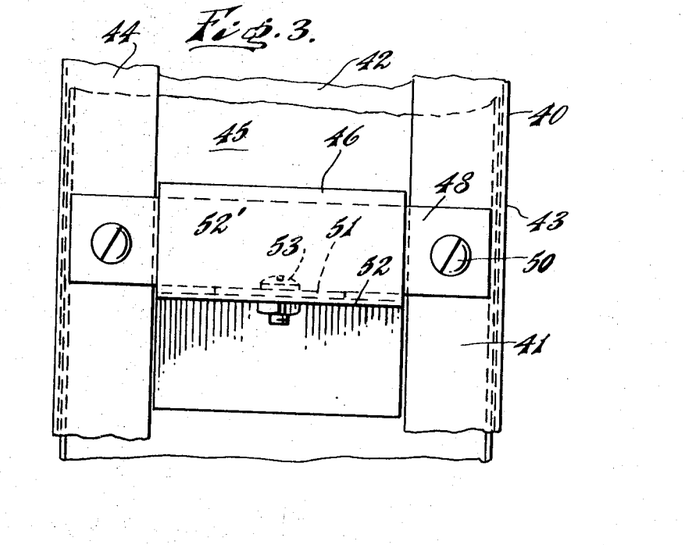
FIG. 3 is a fragmentary bottom plan view of FIG. 1.

Referring to FIGS. 1 to 3, an envelope 40 suitable made of sheet metal or the like consists of a first portion 41 of U-shape having a base of the U42, arms of the U 43, and opposite inwardly directed flanges 44 at the ends of the U. The envelope 40 has a second portion or cover 45 which telescopes within the first portion 41 and has a base of the U 46 and arms of the U 47 directed in the same direction as the arms 43 of the U 41. The cover is wide enough to make a tight but movable fit with the arms 43 of the U 41.

At several points along the length of the envelope bridges 48 extend across the otherwise open end of the first portion 41 of the envelope between the flanges 44 and are secured to these flanges by screws 50 or by welding. Suitable near the middle of each bridge there is an angle bracket 51 extending from the bridge toward the cover 45 and engaging a cooperating bracket 52 mounted on the cover and extending away from it, the two brackets having an adjustable slot and bolt connection as shown at 53. At the outer end the bracket 52 has a handle 52'.

With the cover open or in its full line position in FIG. 1, wires or conductors 54 are threaded through the duct space 55, there being ample room because the open position of the cover allows extra space. Each of the wires or conductors consists of a plurality of laminations 56 which are much wider than their thickness and are arranged with their broad sides in engagement. They will preferably be cabled together as described.

The group of laminations 56 making up each conductor are surrounded by insulation 57 which has in a cross section on a broad side 58 and a narrow side 60. In the preferred embodiment, when the cover is closed, the broad side 58 of one conductor engages the base of the U 42 of the first portion of the envelope, and the broad side 58 of the insulation of another conductor engages the base of the U 46 of the cover. Thus very effective heat transfer is made to the envelope which aids in dissipating heat.

Assuming that each of the conductors shown in FIG. 1 corresponds to one phase of a three-phase distribution, it will be evident that this is a very low impedance configuration with the conductors closely and intimately spaced so as to reduce the voltage drop and permit the use of conductors of smaller cross section.

Since the conductors are long and have relatively few joints, there will be lower contact resistance, thus reducing the heat loss as compared to busways and conduit with wire. Also the space occupied is less than in a busway and the cost is lower. As will be seen, very few special fittings are required.

Figures 4, 5, 6, 7:
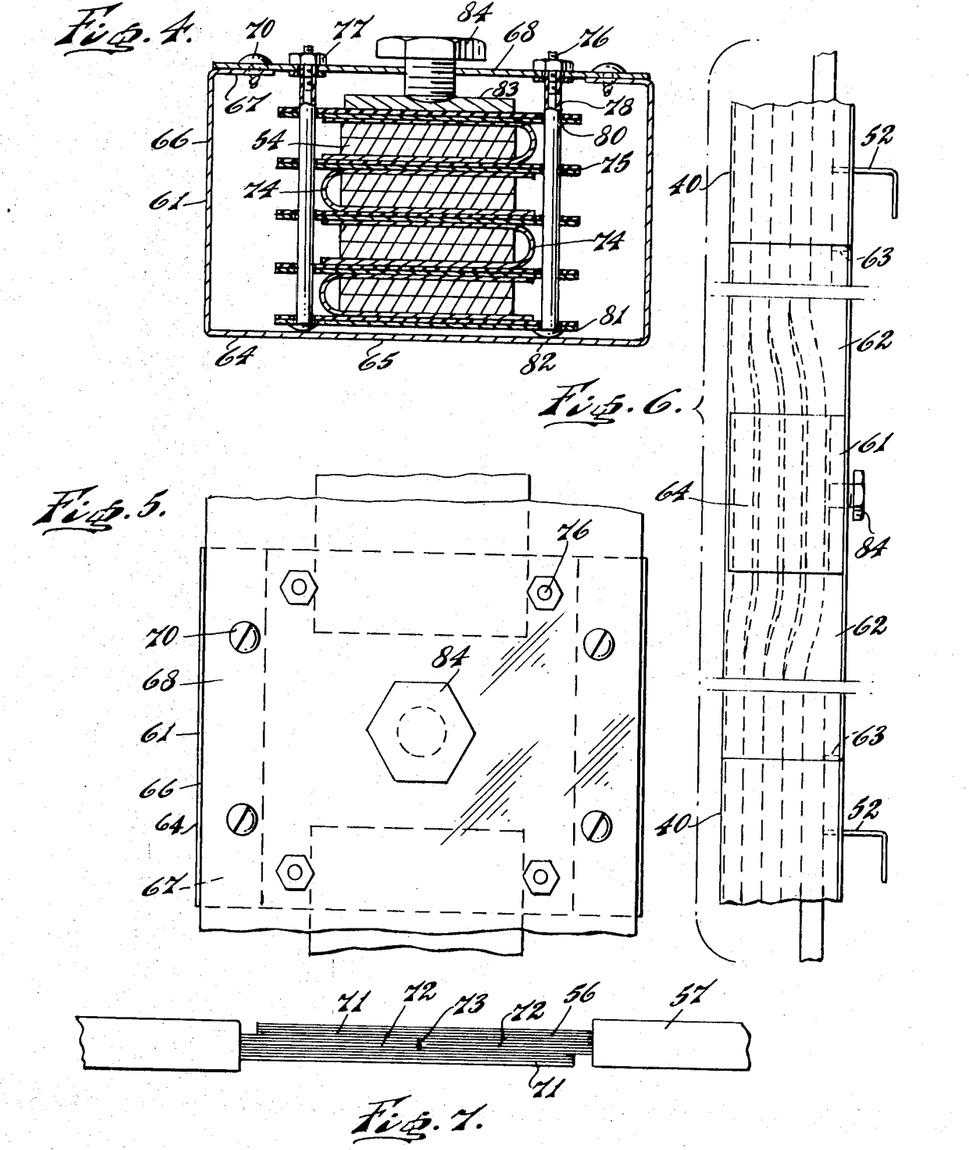
FIG. 4 is a transverse section through a connector, in this case the stack of conductors being four high rather than three high as in FIG. 1.
FIG. 5 is a fragmentary top plan view of FIG. 4.
FIG. 6 is a fragmentary side elevation of a connector showing adapter portions which innerconnect with ordinary conduit sections.
FIG. 7 is an enlarged side elevation showing the connection of a pair of conductors, one in prolongation of the other.

Straight sections of the envelope as shown in FIGS. 1 to 3 will extend indefinitely until the end of the conductors is reached. The straight sections will be joined by unions as later described. At the ends of the conductors a connector 61 is inserted as shown in FIGS. 4, 5, and 6, the connector being joined to straight envelopes 40 by adapter sections 62 (FIG. 6) extending into the ends of the connector and connecting with a straight section after the manner of the unions to be described. The adapter section has curtain flanges 63 which seal the space which otherwise would be provided within the U of the covers of the straight section.

The connectors 61 consists of a U-shape first portion 64 having a base of the U 65 and arms 66 terminating in opposite inwardly directed flanges 67. A cover 68 is fixed to these flanges suitably by screw 70 or by welding. Each of the wires or conductors 54 is free from insulation 57 adjoining the ends (suitably 1½ inches back from the ends or more if required) and approximately half of the laminations of each conductor is allowed to extend as a long overlapping portion 71, FIG. 7, and the other half of the laminations on the side adjoining the other conductor are cut off short to make a short portion 72 of the other conductor as shown.

Each of the pair of exposed conductor ends forming a joint as shown in FIG. 7 is surrounded by a U-shaped sheet of installation 74 shown in FIG. 4 and the bases of the U's of the alternate joints are arranged oppositely. Between the insulating sheets 74 are straight insulating sheets 75 also located at the top and bottom of the stack and extending laterally beyond the conductors. Bolts 76 are secured to the cover plate 68 by nuts 77 and these are insulated from the conductors by insulating sleeves 78 which pass through holes in the insulating sheets 75. At the opposite ends of the bolts a metallic pressplate 81 is held by the bolt heads 82.

At the top of the stack, pressplate 83 is urged toward the pressplate 81 by a screw 84 threaded through the cover 68 and conveniently making a rotatably nonremovable fit with the pressplate 83 if desired.

Figures 4A, 7A, 21:
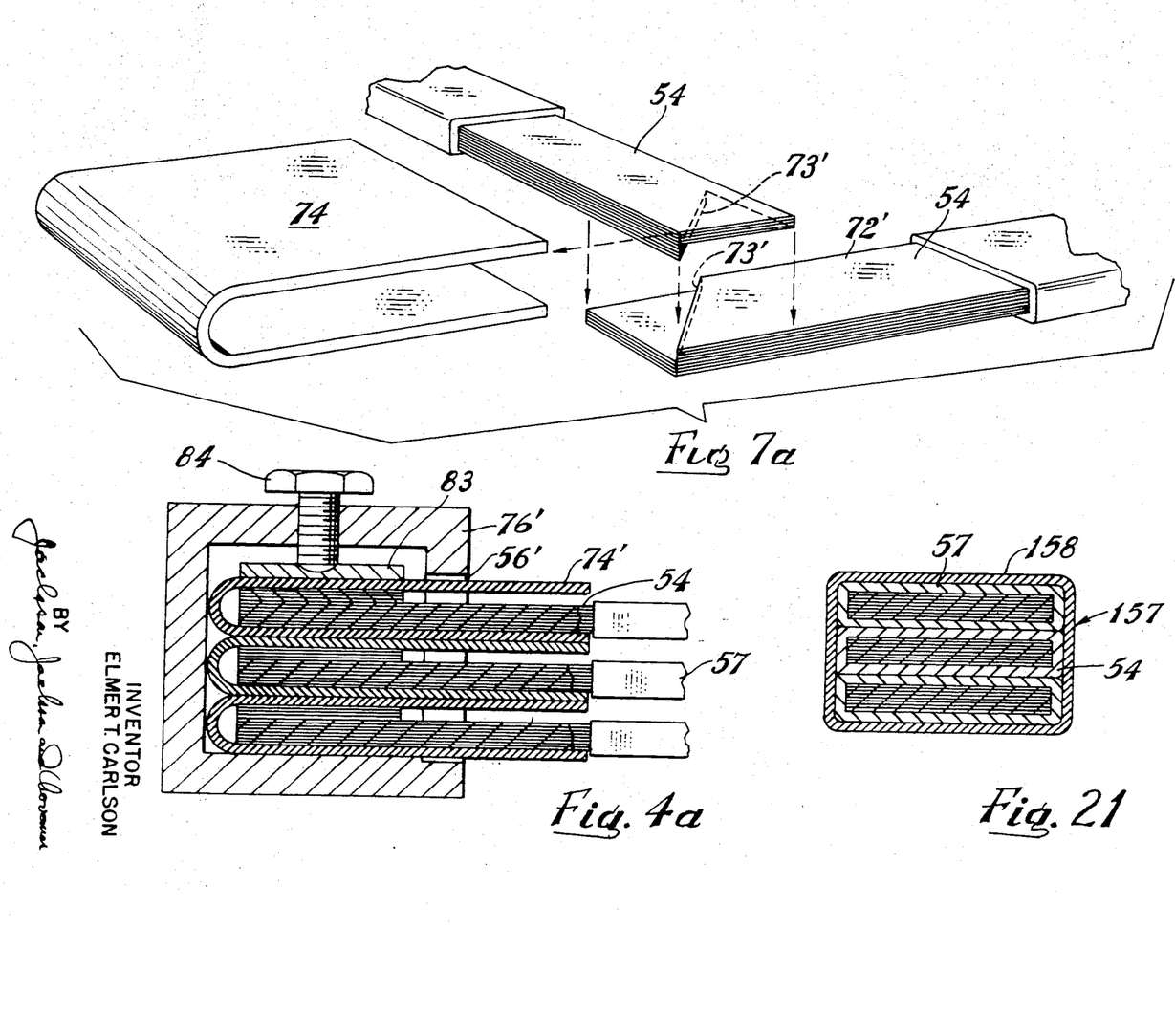

In FIGS. 4a and 7a, I show a modified and preferred form of connector having a press body 76' provided with a window $76^2$ on either side or straight ahead, of rectangular form suitably of cast metal and a compression screw 84 acting on a stack of laminated conductors separated by insulation 74'. While the conductors here are at right angles, they can be arranged straight ahead by cutting one short group of laminations on the opposite diagram.

Where a smaller number of conductors are being used, insulating filler blocks can be inserted in the press.

In some cases as shown in FIG. 7a, the short laminations 72' may have diagonal or angular end cuts 73'. Thus as two conductors are joined endwise, the diagonal portions abut as shown in FIG. 7a to extend in prolongation of one another, but shown in FIG. 7a if they are to extend out in right angles one conductor is moved into right-angle relation with respect to the other conductor so that in either case the short laminations abut one another and the longer laminations extend over and make electrical contact with the sides of the short laminations of the other conductor. It will be evident that the body of the press as shown in FIG. 4a may permit right-angle connections at 56' in either direction.

It will be evident that the joint design shown permits making effective joints in bare or insulated conductors having two or more flat laminations which will engage face to face under considerable pressure without requiring drilling holes in the conductors to insert bolts or the like.

It will furthermore be evident that the system of the invention provides joint areas which are substantially greater than the cross section of the laminated conductors themselves thus reducing voltage drop at the joints and reducing heating at the joints.

It will further be evident that the face to face contact areas of the laminations at the joints are substantially equivalent to the overlapping areas of two solid overlapping busbars, thus keeping down joint resistance and localized heating.

It will furthermore be evident that the diagonal or angular cut of the abutting ends of the shorter laminations makes it possible to join conductors optionally in straight line relation or at 90° to the right or left, cutting the diagonal as required.

It will further be evident that the thickness of the joint of laminated conductors is substantially less than the thickness of two overlapping face to face busbars making a joint, resulting in greater compactness.

It is further evident that the overlapping lamination 54' are visible between the insulation separators 74' to ascertain their proper operating position.

It is further evident that the overlapping laminations of each conductor joint can be individually secured together by conventional means of welding, riveting or bolting.

Figure 8:
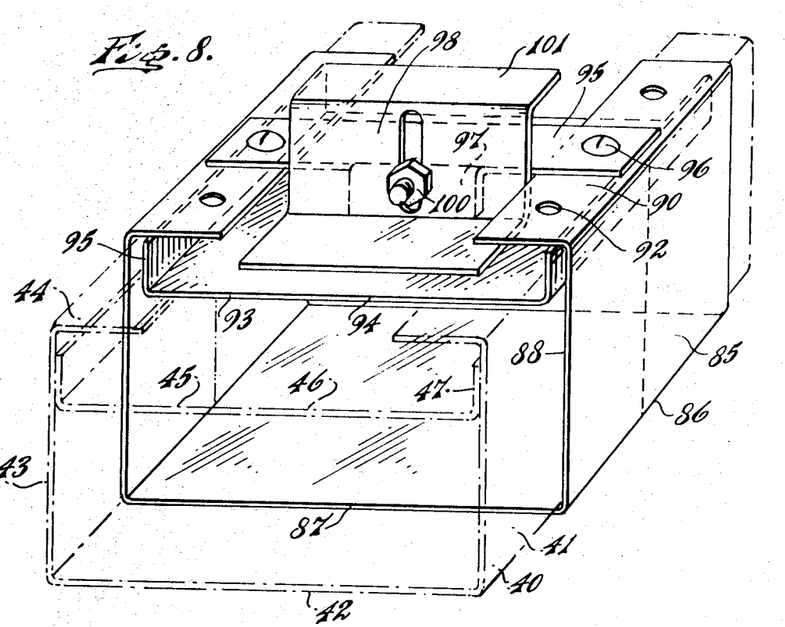
FIG. 8 is a perspective of a union, showing in phantom two straight conduit sections extending into it from opposite ends.

Any two straight envelope sections are joined together end-to-end as shown in FIG. 8 by a union 85 which resembles the straight envelope section shown in FIGS. 1 to 3 and receives the ends of the straight envelope section within the union. The union 85 has a first envelope section 86 of U-shape having a base of the U 87, arms of the U 88 and oppositely directed inward flanges 90 at the ends of the U. The first envelope portion 41 of the straight envelope fits exactly within this and extends to the middle of the union and is held by screws 92 extending through flanges 90 of the union and flanges 44 of the envelope section.

A second portion or cover 93 of the union is of U-shape and has a base of the U 94 and arms of the U 95 extending in the same direction as the arms of the U 88 of the first portion 86 of the union, the cover 93 telescoping within the first portion 86 of the union with sufficient clearance so that the cover 45 of the envelope can surround the cover 93 of the union.

The inwardly directed flanges 90 of the union are spanned at the center by a bridge 95 secured by screws 96 and having an inwardly directed bracket 97 which cooperates with and engages against an outwardly directed bracket 98 from the union cover 93, the cover being anchored in any adjustment position by a bolt and slot combination 100 acting between the brackets 97 and 98. A handle 101 is provided at the outer end of the bracket 98.

Figure 9:
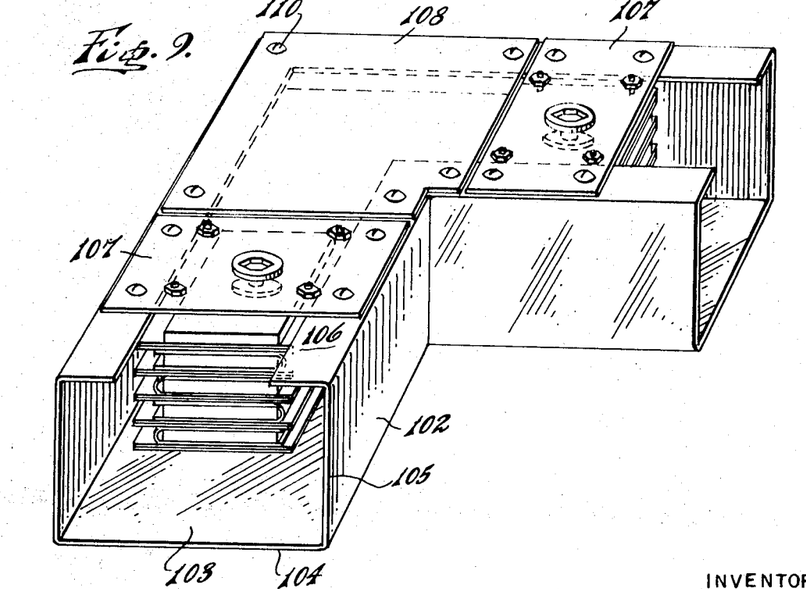
FIG. 9 is a perspective of an angle connector according to the invention.

Suitable angle connectors, branch connectors, crossovers and tees are provided following the general scheme of FIG. 9 or using the preferred arrangement of FIG. 4a. An angle housing 102 has a first portion 103 of U-shape form provided with a base of the U 104, arms of the U 105 and opposite inwardly directed flanges 106 at the ends of the U. Connectors 107 as shown in FIGS. 4 and 5 are mounted at opposite ends in the angle housing 102, the wires or conductors being clamped in these connectors as previously described. A cover plate 108 covers the remaining portion of the angle connector, being secured to the flanges 106 by screws 110. At the adjoining ends the straight envelope sections extend into the angle connector housing and are suitable secured thereto as by screws in the manner described in connection with FIG. 8.

Figure 10:
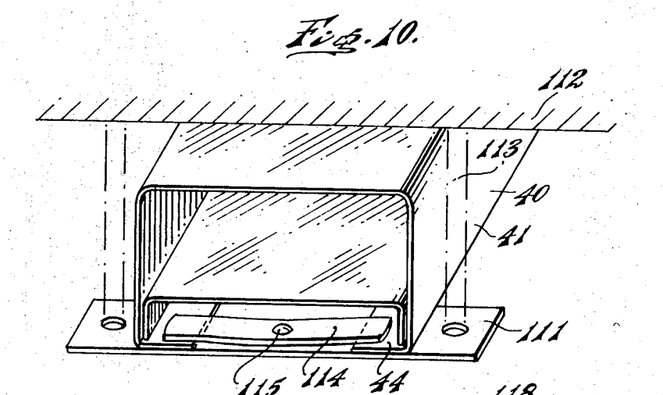
FIG. 10 is a fragmentary perspective showing a conduit supported by one form of hanger, omitting the conductors for clarity in illustration.

In FIG. 10 I illustrate a hanger 111 extending across the envelope 40 at the opened sides of the U and anchored to structure 112 of the building by bolts 113. A resilient latch 114 is pivoted at 115 on the hanger 111 so that it can be released by turning it at right angles to the hanger and can lock under the flanges 44 as shown in FIG. 10 by turning longitudinally in respect to the hanger, the latch tending to remain in its latched position because of its spring action.

Figures 11, 12, 13:
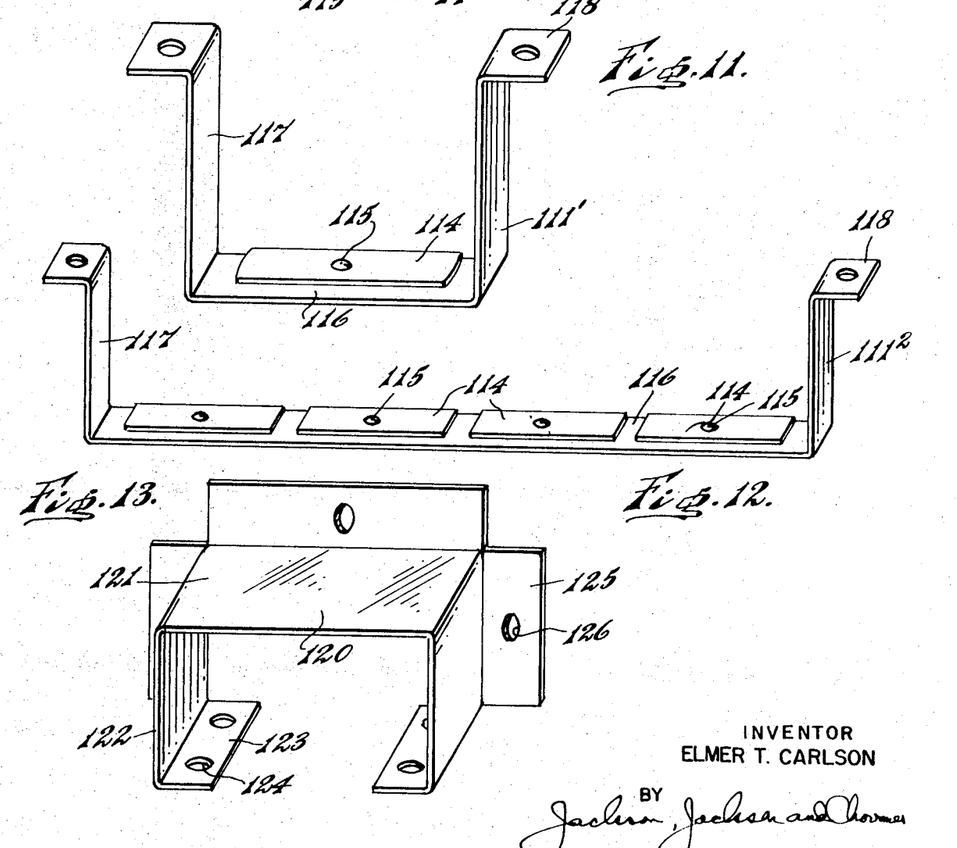

In FIG. 11 a hanger 111' is of U-form having a base of the U corresponding in position to the hanger 111 and arms 117 of the U and ears 118 which permit the use of very short anchoring screws extending through openings in the ears.

In FIG. 12 a hanger $111^2$ similar to that of FIG. 11 is provided for gang mounting of a plurality of conduits side by side, each held by one of the pivoted latches 114.

FIG. 13 shows a flanged adapter 120 of U-shape, which surrounds the end of a straight envelope and has a base of the U 121, arms to the U 122 and opposite inwardly directed flanges 123 having openings 124 for fastening to the envelope of the straight section. At the end flanges 125 and openings 126 permit securing the adapter to a switchboard or the like.

Figure 14:
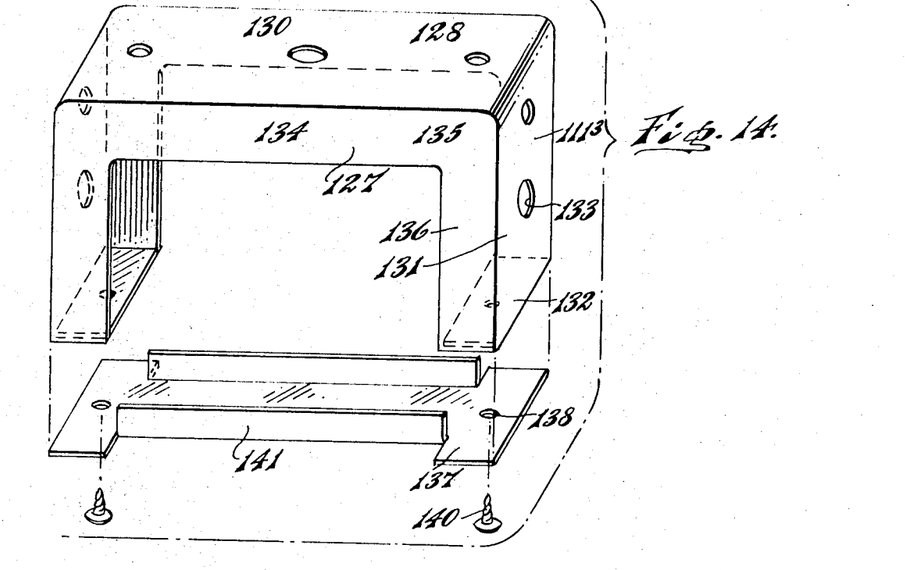
FIG. 14 is an exploded perspective of the preferred form of hanger with provisions for cooling of the envelope.

The preferred form of hanger is shown in FIG. 14. A hanger $111^3$ has U-shaped portion 127 consisting of a U-shaped housing 128 having a base of the U 130, arms of the U 131 and opposite inwardly directed flanges 132 at the ends. The housing is adequately larger than the envelope of the conduit so as to allow considerable airspace for cooling, and openings 133 are provided for securing to the building and for mounting. At each end of the housing 128 U-shaped end portions 134 are secured thereto, having bases of the U 135 and arms of the U 136 and engaging the outside of the envelope.

The hanger $111^3$ has a cover 137 provided at the ends with openings 138 for screws 140 securing the cover to the flanges 132. The cover has inwardly directed parallel flanges 141 at the opposite sides which extend within the U of the cover 45 of the envelope and stiffen the cover 137.

Figures 15, 16, 17, 19:
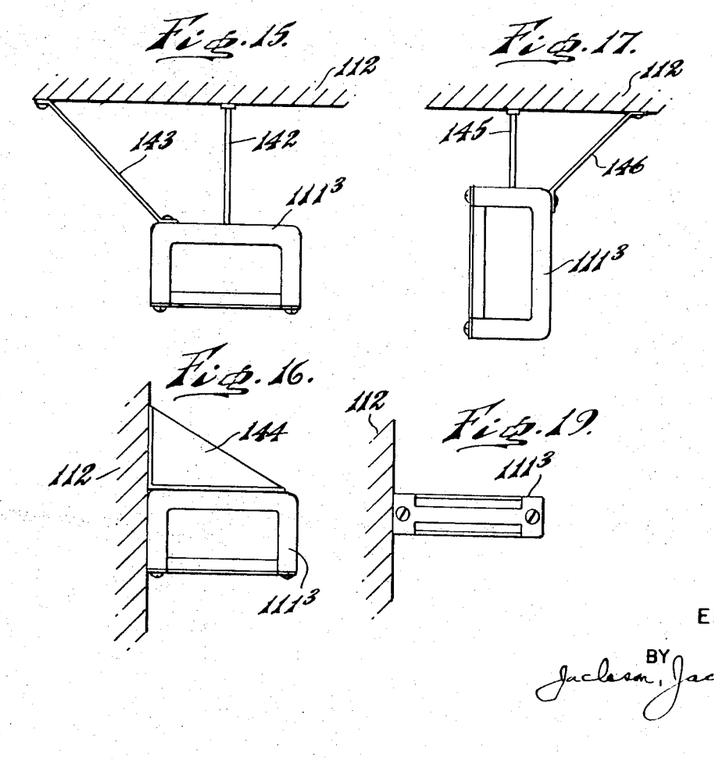
FIG. 15 is a front elevation showing the hanger of FIG. 14 in position to support a conduit with the conductors horizontal.
FIG. 16 is a front elevation similar to FIG. 15 showing the hanger supported from a single bracket.
FIGS. 17 and 18 are front elevations showing various ways of supporting the hanger of FIG. 14 with the broad faces of the conductors vertical but the conductors themselves extending horizontally.
FIG. 19 is a front elevation of the hanger of FIG. 14 disposed to support a vertical stretch of conduit.
Figure 18:
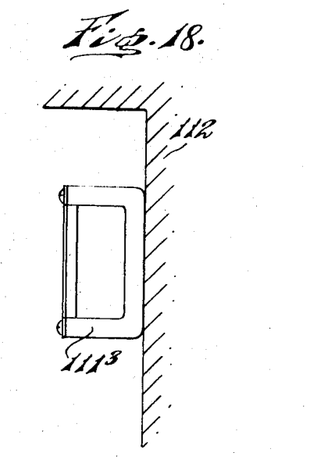

The hanger $111^3$ can be suspended to hold the conduit horizontally, with the wide faces of the conductors horizontal, by a suspension bolt 142 and brace 143 anchored to the building in FIG. 15, or by a bracket 144 secured to the building in FIG. 16. If the conduit is to extend horizontally with the broad surfaces of the conductors vertical, this can be done by supporting the hanger $111^3$ by a suspension bolt 145 and a bracket 146 shown in FIG. 17 or by anchoring the hanger the side of the building as shown in FIG. 18.

If the conduit extends vertically, then the hanger $111^3$ can be supported on the building as shown in FIG. 19.

Figure 20:
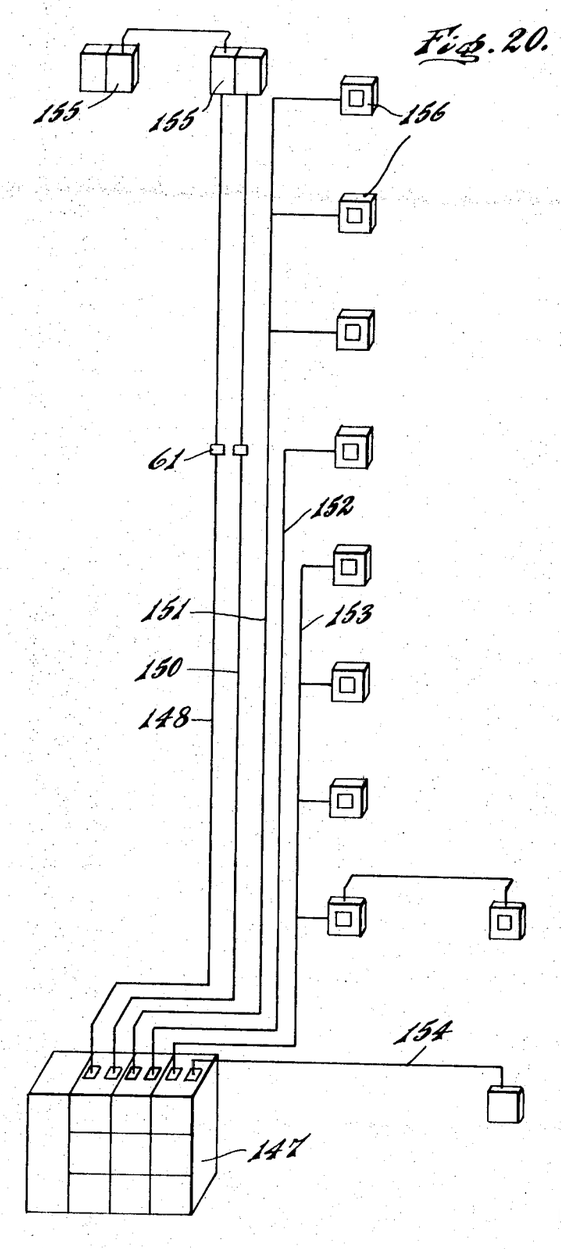
FIG. 20 is a layout diagram for a conduit system according to the invention.

FIG. 20 shows one example of an arrangement for the conduit of the invention in a multistory building. A switchboard 147 connects to conduits 148, 150, 151, 152, 153, and 154. Each bend in the conduit contemplates the use of a fitting of the general character as shown in FIG. 4 or 9 and likewise each branch in the conduit contemplates a generally similar fitting. Unions will be used at the ends of each straight envelope section and conduits 148 and 150 require connectors 61. At the top of the building, distribution centers 155 are provided for various elevators, and at various floor levels distribution centers 156 are provided which supply power there required.

In FIG. 21 a cable 157 is shown having a cable insulator or jacket 158 surrounding conductors of the character shown for example in FIGS. 1 and 4 so that all conductors can be introduced in the envelope at one time, rather than introducing separate conductors. It is believed that the cable embodiment will be the preferred form of the invention.

In normal operation, first the hangers will be installed, and then a succession of straight envelope sections joined by unions, are provided, with angle connectors where required, and with straight line connectors at positions where conductors will terminate. With the covers expanded or opened in the envelopes, the ends of the conductors are extended into the disassembled connectors between the insulation layers. Then the press is tightened. When the wiring in a particular area has been completed, all of the covers are closed until the top and bottom of the stack of conductors or the cable are in firm engagement with the envelope to promote intimate heat transfer. It will be noted that the cover plates of the envelopes can be closed without interference by the hangers.

If it is desired later to change the installation, in many cases the covers can be loosened by loosening the locking screws and arrangements can be made to insert an additional conductor or conductors in the same envelope and then to again tighten the covers on the stack. If desired the conductors can be removed and reinstalled. These same favorable conditions result with copper conductors.

The conduit sections can preferably be shipped with covers closed to minimize the space requirement and then the covers can be opened at the time of installation.

The following table shows a comparison of the ampere ratings at 600 volts three-phase 60-cycle AC systems for utilization of various sizes of wires in conduits according to the invention, as compared to similar aluminum insulated wire exposed to the air and similar insulated wires in prior are conduits. It will be noted that the results obtained by the invention are favorable.

Comparison of Conduit of Invention with National Electric Code Ratings in Amperes.

| Circular mils, thousands | Insulated Al conductors, single in free air | | Insulated Al conductors, 3 in conduit XHHW | Conduit of invention, Al laminations, calculated |
|---|---|---|---|---|
| | Dry XHHW | Wet THWN | | |
| 200 | 300 | 280 | 185 | 300 |
| 250 | 330 | 315 | 215 | |
| 300 | 375 | 350 | 240 | 350 |
| 350 | 415 | 395 | 260 | |
| 400 | 450 | 425 | 290 | 400 |
| 500 | 515 | 485 | 330 | 500 |
| 600 | 585 | 545 | 370 | 600 |

In view of my invention and disclosure, variations and modifications to meet individual whim or particular need will doubtless become evident to others skilled in the art, to obtain all or part of the benefits of my invention without copying the electrical conduit system shown, and I therefore claim all such insofar as they fall within the reasonable spirit and scope of my claims.

Having thus described my invention what I claim as new and desire to secure by Letters Patent is:

1. In an electrical conduit, a first stack or cable of conductors, each conductor being of rectangular cross section having the broad sides parallel, a second stack or cable of conductors, each conductor being of rectangular cross section, having the broad sides parallel and parallel to the first stack of conductors, conductors of the first stack and second stack overlapping and being in contact at the ends, the stacks being surrounded by insulation of rectangular exterior contour except at the ends, envelopes surrounding the stack of conductors, a connector housing connecting the envelopes and surrounding the place where the conductors overlap, a series of insulating separators between the conductors within the connector housing, and a press attached to the connector housing surrounding the overlapping conductors and insulating separators, said press at one end supporting the stacks of overlapping conductors and having screw means in the press at the other end bearing against the overlapping conductors and bringing pressure on them to make contact, said screw means operating from outside the connector housing upon stacks of variable height in which each container consists of a plurality of strip laminations with their broad sides in contact, and in which certain laminations of each conductor are long and certain laminations of each conductor are short at the ends, the long laminations of one conductor overlapping short laminations of the corresponding conductor and making contact with short laminations of the other conductor at the joint within the press and the short laminations of one conductor abutting short laminations of the other conductor.

2. An electrical conduit of claim 1, in which the abutting lengths of the short laminations are at right angles to the ends of the short laminations.

3. An electrical conduit of claim 1, in which the abutting ends of the short laminations are diagonal with respect to the lengths of the short laminations.

4. An electrical conduit of claim 3, in which the respective conductors connected end to end are at right angles to one another.

5. In an electrical conduit, a first conductor of rectangular cross section, a second conductor of rectangular cross section having its broad sides parallel to the first conductor, the two conductors overlapping and being in contact at the ends, the conductors being surrounded by insulation of rectangular exterior contour except at the ends, envelopes surrounding the first conductor and the second conductor, a connector housing connecting the envelopes and surrounding the place where the conductors overlap, insulation around the conductors within the connector housing, and a press attached to the connector housing surrounding the overlapping conductors and insulation, said press at one end supporting the overlapping conductors and having screw means for the press at the other end operative from outside the connector housing, bearing against the overlapping conductors and insulation and bringing pressure on them to make contact with conductors of variable thickness, in which each conductor consists of a plurality of strip laminations with their broad sides in contact, in which certain laminations of each conductor are long and certain laminations of each conductor are short at the ends, long laminations of one conductor overlapping short laminations of the other conductor and making contact with short laminations of the other conductor at the joint within the press, and short laminations of one conductor abutting short laminations of the other conductor.

6. An electrical conduit of claim 5, in which the abutting ends of the short laminations are at right angles to the lengths of the short laminations.

7. An electrical conduit of claim 5, in which the abutting ends of the short laminations are diagonal with respect to the lengths of the short laminations and the conductors are at right angles to one another.